United States Patent [19]

Dwyer

[11] Patent Number: 4,530,076
[45] Date of Patent: Jul. 16, 1985

[54] FREQUENCY DOMAIN NON-LINEAR SIGNAL PROCESSING APPARATUS AND METHOD FOR DISCRIMINATION AGAINST NON-GAUSSIAN INTERFERENCE

[75] Inventor: Roger F. Dwyer, Niantic, Conn.

[73] Assignee: The United States of America as represented by the Secretary of the Navy, Washington, D.C.

[21] Appl. No.: 508,649

[22] Filed: Jun. 28, 1983

[51] Int. Cl.³ .............................................. G01S 3/86
[52] U.S. Cl. ................................... 367/135; 367/121;
367/901; 364/574; 364/715
[58] Field of Search .......................... 455/63, 278, 296;
367/135, 138, 901, 121, 119, 136; 364/726, 551,
552, 574, 715; 343/5 SA, 5 DP, 7 A

[56] References Cited

U.S. PATENT DOCUMENTS

| | | | |
|---|---|---|---|
| 4,017,859 | 4/1977 | Medwin | 367/901 X |
| 4,031,364 | 6/1977 | Wilmot | 364/552 X |
| 4,089,055 | 5/1978 | Dyer et al. | 364/551 |
| 4,207,624 | 6/1980 | Dentino et al. | 367/901 X |

OTHER PUBLICATIONS

Croxton & Cowden: (Textbook) Applied General Statistics Chapt. 10; Dispersion, Skewness and Kurtosis, pp. 239–235 of interest, Prentice-Hall, Inc., 1939.
Merkle et al.: Probability Density Functions of Measured Data, Wright Patterson Air Force Base, U.S. Government Publication, 1973, pp. 181–188.

Primary Examiner—Salvatore Cangialosi
Assistant Examiner—Brian S. Steinberger
Attorney, Agent, or Firm—Robert F. Beers; Arthur A. McGill; Michael J. McGowan

[57] ABSTRACT

Apparatus and method for discriminating against non-Gaussian noise. Analog signals from an array of sensors are converted to real and imaginary digital representations and processed such that non-Gaussian noise is separated from signals of interest. The processor uses estimates of Kurtosis and quantiles from either past or adjacent frequency components to construct non-linear elements, which are then used to process remaining signal data to improve the signal-to-noise ratio thereof by removing non-Gaussian noise therefrom.

2 Claims, 6 Drawing Figures

FREQUENCY DOMAIN NON-LINEAR SIGNAL PROCESSING APPARATUS AND METHOD FOR DISCRIMINATION AGAINST NON-GAUSSIAN INTERFERENCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to signal processing and more particularly to an apparatus and method for discriminating against non-Gaussian noise contamination of acoustic signals or the like thereby improving detection and estimation thereof.

(2) Description of the Prior Art

Signal processors generally must separate the signal from the broadband noise in which it is additively embedded. Traditional and currently used methods for detection and estimation of such noise contaminated signals either assume that the underlying noise environment is Gaussian or else the noise is not considered in the technique. For example, the estimated noise spectrum may be used to detect narrow-band signals, which technique is near optimum if the noise is Gaussian. However, if the noise is non-Gaussian then such a technique is not optimum and performance is significantly degraded. What is needed is a signal processor which can discrimate against non-Gaussian noise thereby increasing the signal-to-noise ratio.

A previous processing technique that is important to this invention uses a discrete Fourier transform (DFT) or a fast Fourier transform (FFT) to extract narrow-band frequency domain signal components. Such a technique is also employed in the present invention.

SUMMARY OF THE INVENTION

Accordingly, it is a general purpose and object of the present invention to provide a method and apparatus for removing non-Gaussian noise effects from contaminated signals of interest. It is a further object that the apparatus and method make use of non-linear elements constructed from past or adjacent frequency components. Another object is that the non-linear elements be constructed using estimates of Kurtosis and quantiles from past or adjacent frequency components. A still further object is to operate in the frequency domain by employing Fourier transform techniques.

These objects are accomplished with the present invention by providing a frequency domain non-linear signal processing apparatus and method for discrimination against non-Gaussian interference comprising means for converting analog signals from an array of sensors such as hydrophones to real and imaginary digital representations, and means for converting digital components into the frequency domain so as to process the real and imaginary signal components in such a way as to separate out ambient non-Gaussian noise from signals of interest. The processing means uses estimates of Kurtosis and quantiles from either past or adjacent frequency components to construct non-linear elements. These non-linear elements are then used to process remaining signal data to improve the signal-to-noise ratio thereof by removing non-Gaussian noise therefrom.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
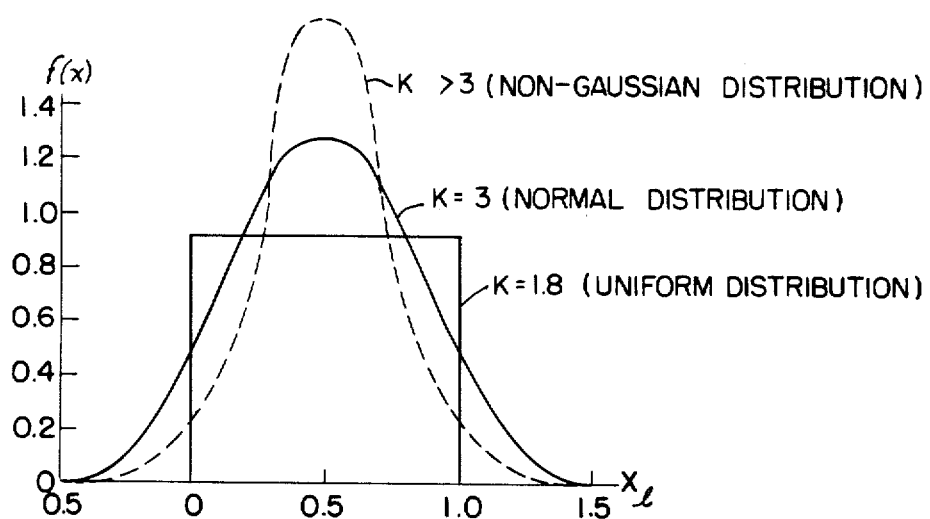
FIG. 1 is a graphical representation of the effects of increasing values of Kurtosis on certain probability distributions.

Referring now to FIG. 1 there is shown a graphic illustration of the increase in peakedness of probability density functions corresponding to an increase in Kurtosis K. The Kurtosis value of interest for this invention is the $K=3$ value associated with the normal or Gaussian distribution. Values of K greater than 3 indicate a non-Gaussian distribution such as is generally exhibited by noise.

Figure 2:
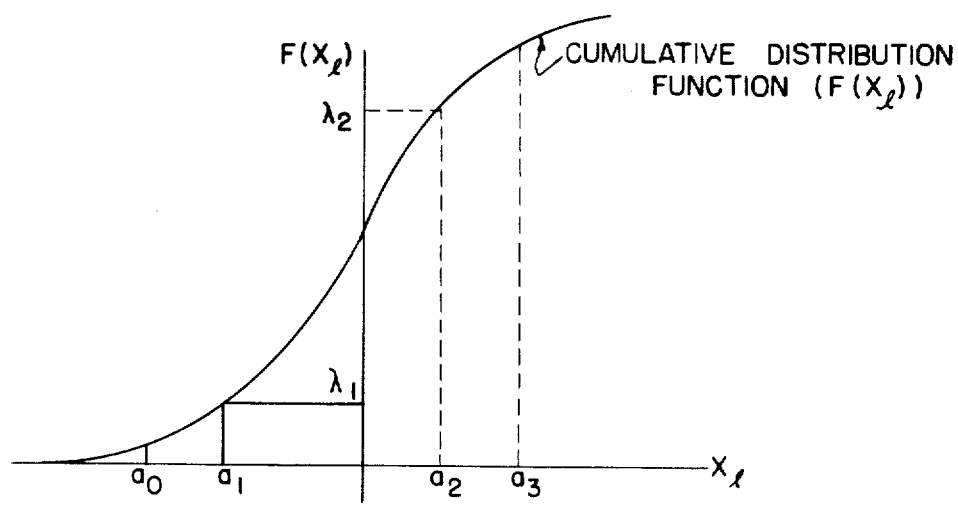
FIG. 2 shows a typical cumulative distribution function and identifies quantiles for selected probabilities $\lambda$.

FIG. 2 shows a typical cumulative distribution curve such as can be generated from any Gaussian or non-Gaussian distribution. At preselected probability levels, such as $\lambda_1$ and $\lambda_2$, corresponding quantiles $a_1$ and $a_2$ respectively may be determined. Additional choices of values of $\lambda$ will yield additional quantiles if desired.

Figure 3:
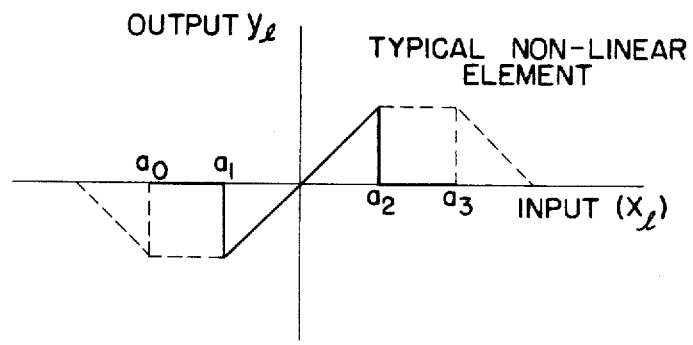
FIG. 3 shows construction of typical non-linear elements.

FIG. 3 shows a typical non-linear element which is constructed using quantiles $a_1$ and $a_2$ from FIG. 2 to yield the non-linearity illustrated by the solid line. Additional non-linearities may be constructed by using additional quantiles such as $a_0$ and $a_3$ producing a form like the dashed lines of FIG. 3 where a more refined element is desired.

Figure 4:
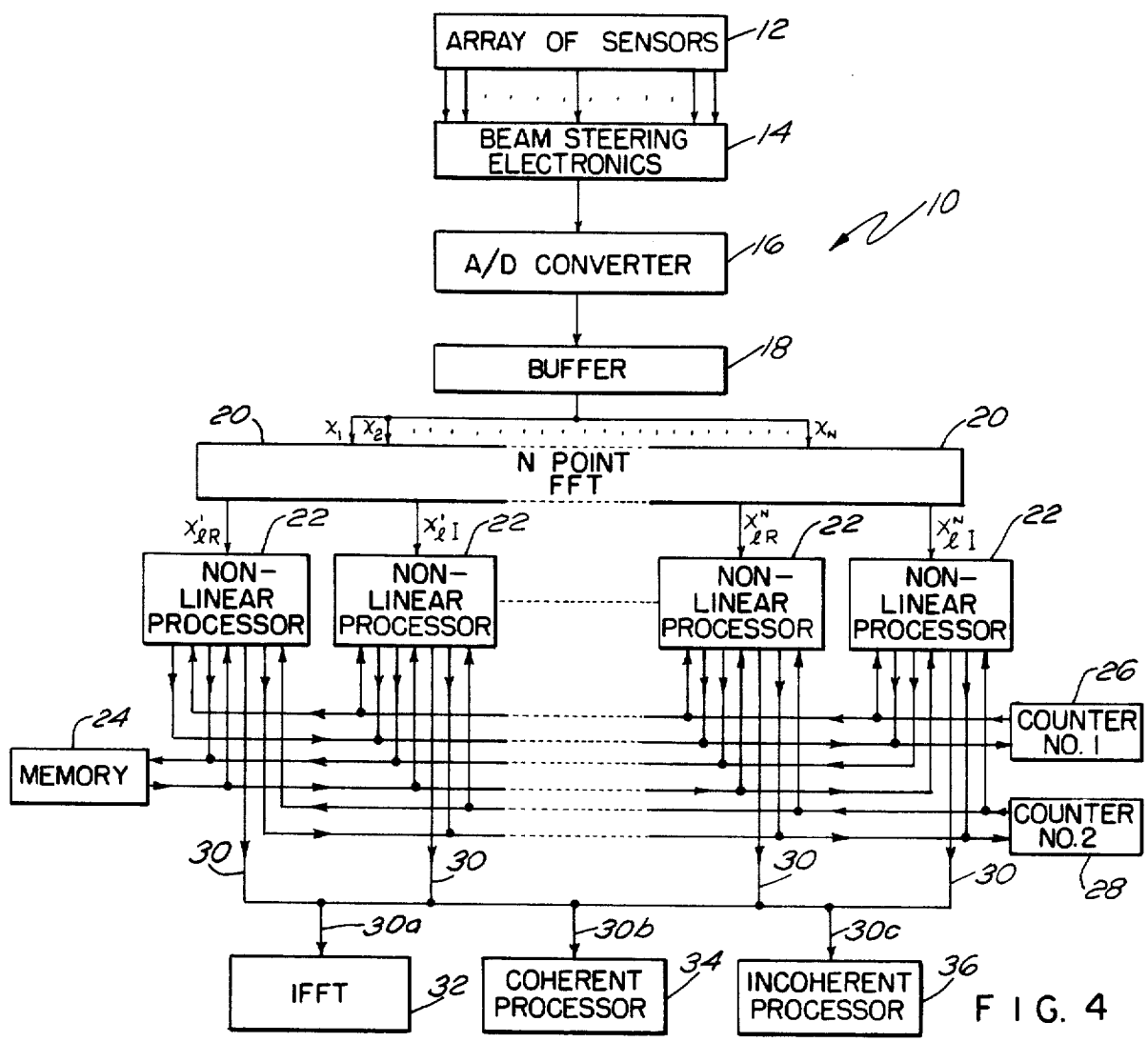
FIG. 4 shows a block diagram of an apparatus built according to the teachings of the present invention.

Referring now to FIG. 4 there is shown a system 10 comprising an array of sensors 12 which sense impinging energy signals such as acoustic pressure and convert the signals to proportional analog electrical signals. The input data consists of broadband or narrowband noise in which a signal is additively embedded. The electrical signals are converted to a spatial beam direction by beam steering electronics 14. The analog, spatial domain, output of beam steering electronics 14 is transmitted to analog-to-digital(A/D) converter 16 where the analog signal is converted to a discrete time signal by sampling in time and quantizing the signal thus producing digital data points representative of the analog signal. The input signal can be narrowband or broadband. The noise is composed of narrowband non-Gaussian components or broadband measurable in the frequency domain distributed over the band. All the frequency components need not be non-Gaussian. Some or all can be Gaussian, since the invention disciminates against this type of noise. Buffer 18 receives the digital data from A/D converter 16 and consecutively stores N digital data samples. The N samples then are transmitted to fast Fourier transform (FFT) 20 which converts the N temporal digital samples to N discrete complex Fourier coefficients representing the digital signal in the frequency domain. The N samples stored in buffer 18 are chosen to match the size FFT selected. Non-linear processors 22 are connected to FFT 20 one each for receiving the real and imaginary part of each discrete frequency component. Each processor 22 separately operates on a real or imaginary frequency component thereby eliminating impulsive and/or Non-Gaussian interference which also may be characterized as fluctuating or frequency modulated interference. Memory 24, connected to each processor 22, receives, stores and transmits to/from each processor 22 data necessary to control processor functioning. Counter 26 counts the number of FFT 20 blocks of N samples in order to establish the convergence rate for the quantile estimation algorithm. Counter 28 counts the number of FFT blocks in order to bound the number of samples used in the Kurtosis estimator.

The input data to processors 20 is described mathematically as the time series $$\{X_{lN+i}\}_{i=1}^{N}, l = 0, 1, \ldots M, \tag{1}$$

where $X_{lN+i}$ represents the data at the $(lN+i)^{th}$ time sample. Further, $X_{lN+i} = S_{lN+i} + n_{lN+i}$, where $S_{lN+i}$ is the signal component and $n_{lN+i}$ is the noise component at the $(lN+i)^{th}$ time sample, respectively. N identifies the FFT size, and $l(=0, 1, \ldots M)$ represents data blocks of N samples each, corresponding to consecutive FFT outputs for a total of $M+1$ outputs.

After each $M+1$ block of N samples each has been FFT'd, the real and imaginary parts of each $N/2$ non-redundant frequency component are accumulated for $M_k \leq M+1$ blocks. Mathematically the frequency components are described as follows:

$$F_l(k) = F_l^R(k) + jF_l^I(k) = 0, 1, \ldots M; k = 1, 2, \ldots N/2,$$

where $j = \sqrt{-1}$ and I represent the real and imaginary parts of each frequency component respectively.

Then $$\{F_l(k)\}_{k=1}^{N/2}$$

for $l = 0, 1, \ldots M_k$ are accumulated and stored. The number $M_k$ is chosen based on the desired confidence bound and fixed. Each output 30 of each processor 22 of the N complex frequency domain data samples may be further selectively processed as desired, e.g., frequency domain output 30a may be further processed by inverse fast Fourier transform 32 (IFFT) which converts the output back to the discrete time domain. Output 30 may also be further processed in the frequency domain by coherent processor 34 or incoherent processor 36 depending upon whether phase information is desired in addition to magnitude information.

Figure 5:
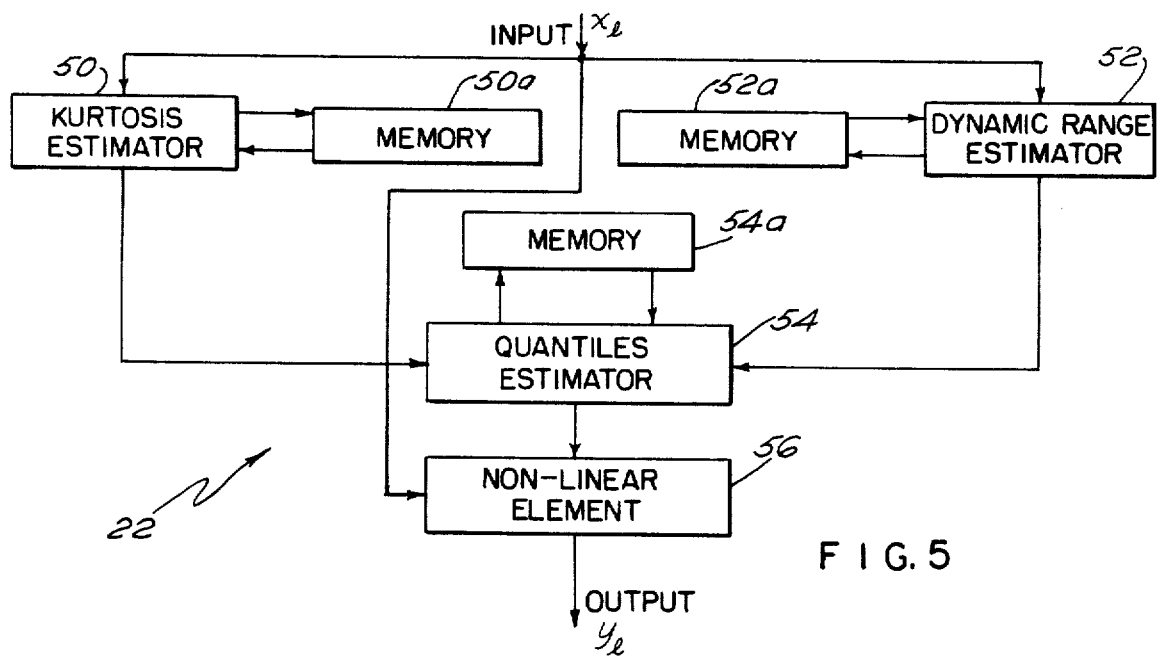
FIG. 5 shows a detailed block diagram of a typical non-linear processor as shown in FIG. 4.

FIG. 5 shows a typical non-linear processor 22 further comprising a Kurtosis estimator 50 in parallel with a dynamic range estimator 52. Estimators 50 and 52 feed into a quantile estimator 54 which in turn controls the functioning of non-linear element 56. Each estimator 50, 52 and 54 has associated therewith separate memory modules 50a, 52a and 54a, respectively, to store each iterative estimate of Kurtosis, dynamic range and quantiles respectively. In operation input data values $X_l$ are used by estimator 50 to determine the Kurtosis for that particular real or imaginary data frequency Fourier coefficient. For each non-redundant frequency component for both the real and imaginary parts the Kurtosis is estimated and stored, the Kurtosis of the $k^{th}$ frequency component of the real part for the $M_k+1$ FFT outputs being defined as:

$$\overline{K^R}(k) = \left[ \frac{1}{(M_k+1)} \sum_{l=0}^{M_k} (F_l^R(k) - \overline{F_l^R(k)})^4 \right] / (VAR^R(k))^2 \tag{2}$$

where $F_l^R(k)$ is the mean of the real part of the $k^{th}$ frequency component over the $M_k+1$ FFT outputs, and $VAR^R(k)$ is the corresponding variance of the real part of the $k^{th}$ frequency component over the $M_k+1$ FFT outputs. The Kurtosis of the imaginary part of each non-redundant frequency component is estimated in a similar way.

The Kurtosis estimate for the real and imaginary parts of each frequency component is compared with a fixed number $K_k$. This number depends upon $M_k$ and the desired confidence bound in the estimate. For the real data evaluation case of the invention, $K_k$ was set to 4 and $M_k$ was 100 and greater. Then for each Kurtosis estimate which exceeds $K_k$ the quantiles, at some determined probability level, which are estimated concurrently for real and/or imaginary parts at the corresponding frequency, are used to construct the appropriate non-linearity. Concurrently, data values $X_l$ are used by estimator 52 to determine the maximum and minimum values of $X_l$ determining the difference between $C_{max}$ and $C_{min}$ which by definition is the dynamic range. Estimator 54, once initiated, receives ongoing estimates from estimator 50 and 52 and continually re-estimates the quantiles. The quantiles are used to construct a non-linearity in which the data at the corresponding frequency and appropriate real and/or imaginary parts are processed. The data at the output of the non-linearity has the property that its distribution is Gaussian or nearly Gaussian.

The quantiles are defined as:

$$a_q = F^{-1}(\lambda_q), q = 1, 2, \ldots, m-1$$

where $$\lambda_q = \int_{-\infty}^{a_q} f(x) dx,$$

and $f(x)$ is the underlying density function.

The $\{\lambda_q\} q = 1, 2, \ldots, m-1$ are chosen and fixed, e.g., $m=3$, $\lambda_1 = 0.25$ and $\lambda_2 = 0.975$ etc.

The quantile recursive estimation algorithm is as follows:

Let $$\{X_l\}_{l=1}^{M_k+1}$$

represent the real or imaginary part of a frequency component. Set $\lambda_q$ as appropriate. The initial values are defined as, $a_q^0 = 0$, $C_{max} = 0$ and $C_{min} = 0$. The functions are defined as, $C_{max} = $ maximum of $(C_{max}, X_l)$, $C_{min} = $ minimum of $(C_{min}, X_l)$ and $$\mu(z) = \begin{cases} 1 \text{ if } z \geq 0 \\ 0 \text{ otherwise.} \end{cases}$$

Then the i-th quantile estimate is defined for each $\{X_l\}l=1,0,\ldots M_{k+1}$ as follows:

Compute $C = C_{max} - C_{min}$ and $A = \mu(a_q^i - X_l)$. Then $$a_q^i = a_q^{i-1} + (C/l) \cdot (\lambda_q - A) \text{ where:}$$

$$a_q^i = \begin{cases} C_{max} \text{ if } a_q^i \geq C_{max} \\ a_q^i \text{ if } C_{min} < a_q^i < C_{max} \\ C_{min} \text{ if } a_q^i \leq C_{min} \end{cases}$$

Once the quantiles are estimated from the the data, the non-linearity is constructed and the data is processed through the non-linearity. Mathematically the operation of the non-linearity is defined as:

$$F_l^R(k) = \begin{cases} 0, \text{ if } F_l^R(k) > a_l^R(k) \\ F_l^R(k), \text{ if } a_1^R(k) \leq F_l^R(k) \leq a_2^R(k) \\ 0, \text{ if } F_l^R(k) < a_1^R(k) \end{cases}$$

where $F_l^R(k)$ represents the data at the output of the non-linearity for the real part at the $k^{th}$ frequency component, and $a_1^R(k)$, $a_2^R(k)$ are the quantiles for the real part at the $k^{th}$ frequency component.

The imaginary part is processed in a similar way. This process is repeated for each $M_k+1$ block making the technique adaptive, which is also part of the invention. The quantiles are then transmitted to non-linear element 56 which uses the quantiles to establish the linear range for that particular $X_l$ data component fed directly to element 56 and which is outputted as $y_l$.

Figure 6:
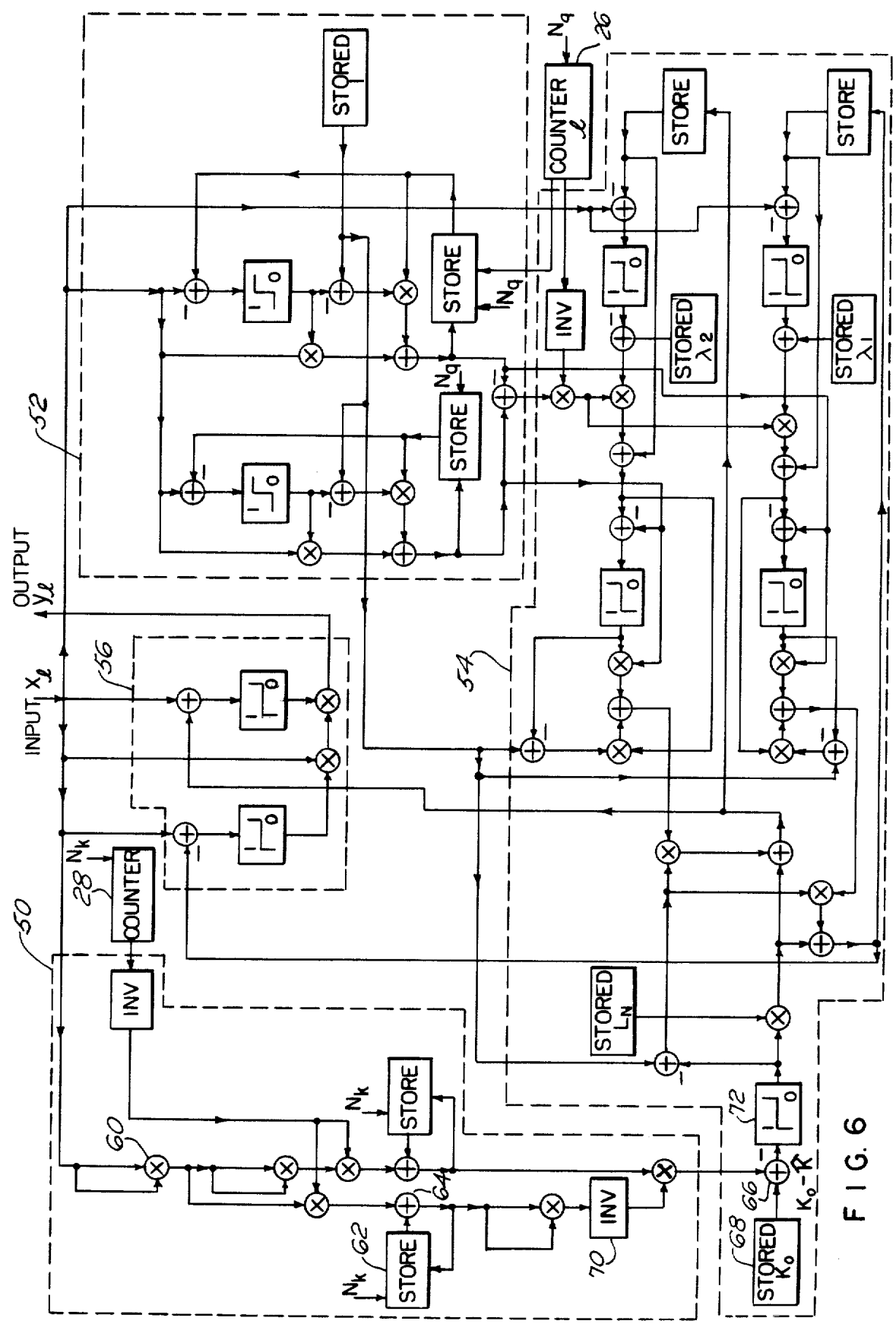
FIG. 6 is a detailed circuit diagram of a typical non-linear processor built according to the teachings of the present invention.

FIG. 6 shows an example of a circuit diagram for a non-linear processor. Signal processing blocks 50, 52, 54 and 56 of FIG. 5 are identified in FIG. 6 by broken lines surrounding the appropriate portions of the FIG. 6 circuit diagram. The input data $X_l$ is fed in parallel to Kurtosis estimator 50 and to dynamic range estimator 52. Kurtosis estimator 50 converts subsequent data blocks of the now discrete frequency data to a Kurtosis estimate. The first phase of this conversion squares the current input value of $X_l$ in multiplier 60. The inputs of multiplier 60 are multiplied to produce the output $X_l^2$. The output of multiplier 60 is fed to two parallel paths which eventually produce the Kurtosis estimate of equation (2). One portion of the output of multiplier 60 is immediately multiplied by the reciprocal of the presently stored value in counter 28 and then added to the value previously stored in register 62 by adder 64. Register 62 stores the current iterative value of $X_l^2$ and resets to zero after $N_k$ iterations. Counter 28 controls the total number of iterations, also reseting at $N_k$. This output of adder 64 is now stored in register 62 for the next iterative cycle. The output of adder 64 is also squared and inverted by inverter 70 to produce the denominator of equation (2). The other portion of the output of multiplier 60 is squared again then multiplied by the reciprocal of the presently stored value in counter 28 and then added to the value previously stored in its associated register, which sum is then stored in the register for the next iterative cycle. This operation produces the numerator of the Kurtosis estimate of equation (2) which is then multiplied by the output of inverter 70 to produce the Kurtosis estimate.

The estimate from Kurtosis estimator 50 is next fed to quantiles estimator 54. The current Kurtosis estimate K from estimator 50 is subtracted in subtractor 66 from a value $K_0$ stored in memory 68 which represents a preselected threshold. The difference $K_0 - K$ from subtractor 66 is compared in comparator 72. If $K_0 - K$ is greater than zero then the output of comparator 72 is one. Otherwise the output of 72 is zero. When the output of comparator 72 is one, the current Kurtosis estimate is below the threshold of significance and stored value $L_N$, representing a large number within the dynamic range, will be used instead of the estimated quantiles. This is done so that the linear region of 56 will encompasses the whole available dynamic range of the data. When the output of comparator 72 is zero then the estimated quantiles from estimator 54 will be used to limit the linear region of element 56. In this way a non-linear element is construced which depends on the available data through the estimation of quantiles and Kurtosis.

The remaining portions of the circuit of FIG. 6 use adders, subtractors, multipliers, counters, comparators, registers, inverters and memory arranged in such a fashion as to produce the desired outputs of estimators 52 and 54 and non-linear element 56. The dynamic range estimator 52 estimates the maximum and minimum values of the $X_l$ which are then used to control the gain in the quantiles estimator and also to limit the quantile values to within the estimated dynamic range of the data. Therefore quantiles estimator 54 is independent of the amplitude level of the data.

The output of quantiles estimator 54 is fed to non-linear element 56. The processor input $X_l$ is passed through non-linear element 56 to produce the output $y_l$. When the processor is first initiated the output $y_l$ will equal the input $X_l$ for several iterations until the estimators can adjust themselves to reflect the data. When the estimators have adapted to the data and the data then changes the estimators will readapt themselves to the new data conditions after counters 26 and 28 have been reset.

The advantages of this invention are that it: (1) improves performance in terms of increased signal-to-noise ratio and gives a high probability of detection at a constant false alarm rate in non-Gaussian noise environments; (2) removes only the non-Gaussian noise components, leaving the Gaussian components unchanged, thereby not degrading performance in Gaussian environments; and (3) adapts to changing noise conditions by estimating the Kurtosis for each $M_k+1$ sample and modifying the discrimination process appropriately.

The new features include:

a. Estimation of Kurtosis for both the real and imaginary parts for each frequency component for each $M_k+1$ sample.

b. For each block of $M_k+1$ samples the Kurtosis is used to discriminate the data and detect non-Gaussian noise in the frequency domain.

c. When non-Gaussian noise is detected the quantiles which are estimated concurrently for the real and/or imaginary parts for the appropriate frequency components, are used to construct the appropriate non-linearity.

d. The quantiles are estimated by a recursive algorithm The recursive algorithm used in the invention is a modified version of a known recursive algorithm. The application to the frequency domain is new.

e. Once the quantiles are known the appropriate data is processed through a non-linearity which depends upon the data.

f. At the output of the non-linearity the data is essentially Gaussian. This process reduces the variance of the noise and therefore improves performance, depending upon the application.

What has thus been described is a frequency domain non-linear signal processing apparatus and method for discrimination against non-Gaussian intereference comprising means for converting analog signals from an array of sensors such as hydrophones to real and imaginary digital representations and means for processing digital components so as to process the real and imaginary signal components in such a way as to separate out ambient non-Gaussian noise from signals of interest. The processing means uses estimates of Kurtosis and quantiles from either past or adjacent frequency components to construct non-linear elements. The non-linear elements are then used to process remaining acoustic signal data to improve the signal-to-noise ratio thereof by removing non-Gaussian noise therefrom.

Obviously many modifications and variations of the present invention may become apparent in light of the above teachings. For example:

a. The estimation of Kurtosis at the output of a FFT for both the real and imaginary parts at each frequency component is a new concept. In the test and evaluation of the invention using real data the skew was also estimated at the same time as the Kurtosis. This skew could also be used to supplement the Kurtosis as a discriminate technique.

b. The Kurtosis at the output of an FFT could be used to detect non-Gaussian signals or non-stationanary or transient signals directly instead of using this information to construct a non-linearity as in the case of non-Gaussian noise.

c. For non-Gaussian interference with Kurtosis values less than 3, a discriminate technique could also be employed. The non-linearity in this case would be different. It would be designed to otimize detection under this type of interference.

In light of the above, it is therefore understood that within the scope of the appended claims, the invention may be practiced otherwise than as specifically described.

I claim:

1. An apparatus for processing against non-Gaussian noise, comprising:

sensing means, adapted to receive impinging energy signals for converting said energy signal to proportional analog electrical signals;

beam steering electronics, connected to said sensing means, for receiving said proportional electrical signals and converting said electrical signals to an analog spatial domain output;

analog-to-digital converter means, connected to said beam steering electronics, for converting said analog spatial domain output to a discrete time signal by sampling in time and quantizing said signal thus producing a plurality of digital data samples representative of said analog signal;

buffer means, connected to said converter means, for receiving and consecutively storing said plurality of digital data samples;

Fourier transform means, connected to said buffer means, for receiving said plurality of digital data samples and converting said samples to a corresponding plurality of complex Fourier coefficients;

a plurality of non-linear processor means, each connected to said Fourier transform means, one each for separately receiving one of the real or imaginary frequency component outputs of said transform means, said plurality of processors each eliminating non-Gaussian interference from said frequency component by processing said frequency component so as to pass it through a non-linearity construction using preselected quantiles and Kurtosis estimates;

memory means, connected to each processor means, for receiving, storing and transmitting control data to/from said processor means;

a first counter means, connected to each processor means, for counting the number of Fourier transform means blocks of data samples so as to establish the convergence rate for estimating said quantiles;

a second counter means, connected to each processor means, for counting the number of Fourier transform means blocks of data samples in order to bound the number of data samples used to estimate Kurtosis;

inverse Fourier transform means, connected to each said non-linear processor means, for receiving the output thereof and converting said outputs back to a time domain digital signal;

coherent processor means, connected to each said non-linear processor means, for determining the phase and magnitude of said frequency domain data; and incoherent processor means, connected to each said non-linear processor means, for determining the magnitude of said frequency component.

2. An apparatus according to claim 1 wherein each of said plurality of non-linear processor means further comprises;

a Kurtosis estimator, for receiving a real or imaginary input Fourier frequency component and estimating the Kurtosis thereof;

a dynamic range estimator, connected in parallel with said Kurtosis estimator, for concurrently receiving the same frequency component received by said Kurtosis estimator and establishing the dynamic range of the data therefrom;

a quantiles estimator, connected to said Kurtosis estimator and said dynamic range estimator, for receiving the outputs thereof and estimating said quantiles therefrom; and a non-linear element, connected to said quantiles estimator, for receiving the output of said estimator and constructing a non-linearity therewith, said non-linear element further receiving said real or imaginary Fourier frequency component and processing said input frequency component so as to remove non-Gaussian interference therefrom.

* * * * *